United States Patent [19]
Szasz et al.

[11] Patent Number: 5,164,273
[45] Date of Patent: Nov. 17, 1992

[54] PSEUDO DUAL CIRCUIT BATTERY AND CIRCUIT FOR USE

[76] Inventors: Andras Szasz, St. Istvan Korut 20, 1137 Budapest Ker; Istvan Vegh, Ilosvay S.P.u. 52, 1147 Budapest, both of Hungary

[21] Appl. No.: 732,196

[22] Filed: Jul. 19, 1991

[51] Int. Cl.[5] ............................................. H01M 2/20
[52] U.S. Cl. ..................................... 429/123; 429/150; 429/160; 429/178
[58] Field of Search ............... 429/149, 150, 160, 161, 429/178, 123

[56] References Cited

U.S. PATENT DOCUMENTS

| | | | |
|---|---|---|---|
| 3,165,689 | 1/1965 | Hughes | 320/18 |
| 3,475,221 | 10/1969 | Jordan et al. | 429/9 |
| 4,239,839 | 12/1980 | McDowall et al. | 429/160 X |
| 4,425,414 | 1/1984 | Solomon | 429/179 |
| 4,883,728 | 11/1989 | Witchira | 429/160 |

Primary Examiner—Anthony Skapars
Attorney, Agent, or Firm—Longacre & White

[57] ABSTRACT

A pseudo double circuit battery and associated circuit for incorporating the battery into conventional vehicle starting and charging systems. The battery is made up of a series of conventional cells and includes at least one cell which has an additional positive or negative terminal to form an auxiliary circuit terminal. During a starting or cranking phase of operation, the main circuit of the battery is isolated from the auxiliary circuit and is connected to energize the heavy load circuits of the automobile. The auxiliary terminal is connected so as to provide stable power to light load circuits, for example the ignition circuit. During running of the automobile the main and auxiliary terminals are connected.

15 Claims, 6 Drawing Sheets

PSEUDO DUAL CIRCUIT BATTERY AND CIRCUIT FOR USE

BACKGROUND OF THE INVENTION

A. Field of the Invention

The invention is related to the start-up and continuing electrical requirements for operation of combustion engines primarily when used for the critical starting period of motor vehicles. The invention is more particularly directed to a dual circuit type of storage battery and associated primary automotive

B. Description of the Prior Art

Both the starting and continuous operation of vehicles driven by combustion engines require electrical energy. Utilization of electrical energy is fundamental when the vehicle engine is started. It accomplishes mechanical movement and provides ignition.

The two functions (mechanical movement and ignition) require different outputs and based on the expected functions their voltage tolerance is different. In addition to the two functions there is a third one the requirements of which resemble the ones of the ignition. With modern technology the importance of this function is increasing; it is the built in functional electronics (electrical controls, sensors, regulators, built-in computers, etc.) and other service electronics (convenience, entertainment, etc.) which are now a common part of most automobile vehicles.

The different electrical components of today's motor vehicles (starter, ignition, lights, electronic entertainment) are all conventionally operated by the same battery. As a result, the net effects of the separate loads are felt by the various electronic components, some of which require less power but which are in need of better power regulation. For instance, the current drain caused by the starter reduces the available voltage for the ignition, lights, fuel injection, etc. The trend of development in automobiles is towards even more complicated electronics, computerized controls, electronic ignition, etc. Built in sensors an regulating devices will doubtless take over all vehicular functions (tire air pressure, road sensing) on time.

The above problem has been resolved in some high performance—and necessarily expensive—specialized cars by using two independent batteries and two generators. Obviously this is not a suitable solution for mass production, modest performance automobiles because of price considerations.

It is therefore justified to introduce an electrical system which retains the advantages of the single circuit, but has the capability (at least when this is critical) to separate the loads with dissimilar characteristics. Considering an isolated need to improve ignition during start-up, there are several transformer and/or electronic systems which increase the voltage and thereby partially resolve this problem. However, the several transformer types were developed to increase the voltage for ignition, and they accomplish just that; other sensitive electronic components—controls and regulators—get only the reduced voltage available. The high initial starting load causes sufficient electric disturbance that the sensitive microelectronic components in many instances are disconnected during that time. This is especially a problem when the components include a memory or time counting function, which can be altered during such power stoppages or fluctuations. Another disadvantage of the transformer is that mechanical movement is needed to accomplish transformation which again emphasizes the basic role of the starter motor and the starting process. The elimination of the above mentioned problems is the motive and purpose of our invention.

Starting requires high mechanical power output (large currents, little demand on stable voltage), at the same time power requirements for ignition are incomparably less—yet a continuous high, relatively stable voltage is needed. Also other electronic devices in the car require a voltage control within 10% and a relatively small power input. (Essentially the requirements of the electronics and ignition can be combined and we will address them under the name of 'ignition' unless otherwise noted).

Separation of the two functions is a requirement. To accomplish this with two batteries would result in a complicated and cumbersome system, since the process of charging and discharging would have to be performed independently for each battery and the two batteries responding to different requirements cannot be interconnected. The double battery method complicates the handling and maintenance in addition to the problem of charging, not to mention the fact that most vehicles' electrical systems in their present form can only be altered/repaired with standard, i.e., widely available, interchangeable components. Based on this the need for the creation of this invention came about to separate the starting and other functions, and at the same time minimally change traditional automotive components already in use and widely available.

SUMMARY OF THE INVENTION

The essence of our invention is the development of a pseudo-double circuited vehicular electrical system and storage battery which in the critical starting load conditions performs with two independent circuits, but under normal running load conditions provides the function of the traditional single circuitry with interchangeable components. In our invention we establish a condition between the double circuited and the traditional circuit making a pseudo-doubling in the period of starting (therefore the name "pseudo-double circuit"). The operation of pseudo-doubling parameters (under what conditions, how long, how etc. should it work in the non-conventional mode) can be regulated. A new battery had to be developed, interchangeable with the traditional, but capable of providing the pseudo-double-circuited function by quasi-independent circuits. The quasi-double circuited battery lends itself very simply to feed an electrical system which under the most critical conditions (cold cranking) enables the functioning of the sensitive electronic sensors, controls and regulators without impairment.

It is common knowledge that acidic batteries have changed little since they were invented in 1859(!) while the need for modern storage of energy has multiplied. Presently approximately 65% of the total power generated by chemical means comes from lead batteries, 70% of that is used for starting of internal combustion engines.

The main purpose of the starter battery is to provide for the initiation of the operating cycles of the combustion engines, i.e. the mechanical movement of valves and pistons (suction, compression, expansion, exhaust). In gasoline engines, the ignition to combust the mixture in the cylinders is also provided by the battery. Once the motor runs, the battery loses its importance—it gets recharged continuously by the generator driven by the engine.

The current provided by the battery is a result of chemical reactions: the amount of such reactions determines the extractable electrical current, the quality of the reactions determines the electromotive force. Assuming that the quality of the reaction is constant, the output then will be determined solely by the quantity of the chemical processes, naturally it must also be considered that the terminal output voltage of the battery changes because the internal resistance changes with use and time.

The acid electrolyte of the lead battery performs two main functions:

it secures the internal conductivity of the cell.

it secures that the reactions take place, it participates in them.

The reversible electromechanical transformation of $PbO_2$ to $PbSO_4$ is a basic process which takes place on the positive electrode plate of the lead-acid battery. The reactions which occur in this transformation are complex and in spite of extensive research are still not fully understood.

As a result of the combined chemical reactions taking place on the electrodes, mixed basic sulfate develops.

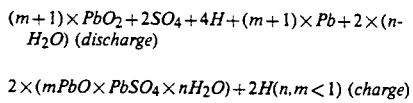

$$(m+1) \times PbO_2 + 2SO_4 + 4H + (m+1) \times Pb + 2 \times (n-H_2O) \text{ (discharge)}$$

$$2 \times (mPbO \times PbSO_4 \times nH_2O) + 2H(n, m < 1) \text{ (charge)}$$

If we observe the transformation of $\alpha\text{-}PbO_2$ (Pbcn space group) to $\beta\text{-}PbO_2$ (P42/mn space group) it can be shown that the phase transformation depends on the pH just the same as the actual structure of the developing surface layer. After numerous (approximately 60) oxidation/reduction cycles a slow transformation is experienced during which the initial 1 $\mu$m $\alpha\text{-}PbO_2$ layer transforms almost entirely to $\beta\text{-}PbO_2$. This $\beta\text{-}PbO_2$ layer harms the reversibility of charging-discharging which is the obvious reason of the decrease in life span of most lead acid type batteries. If the surface of the electrode is treated on several other pH levels the $\alpha\text{-}PbO_2$ layer converts almost completely to the $\beta$ phase after a few cycles. The process can be visualized by realizing that the initial $PbO_2$ layer is a porous, conductive electrode, while the subsequently formed later has a more dense characteristic. In the first case the porosity of the separated layer results in a better reversibility of the reduction/oxidation process. In the case of the dense layer during the reduction cycle the conversion to $PbSO_4$ quickly develops a non-conductive layer which prevents the reverse reaction, therefore little change can be observed in the phase composition during the subsequent potential cycles. At the same time under the influence of the high acid gradient miscellaneous processes may dominate on the electrode surfaces. It is possible for a Pb with high oxidation number ($Pb_3O_4$) to appear on the plates (electromotive force over 2 V!) and because of the unbalanced situation the $\beta\text{-}PbO_2$ blocking surface is more difficult to realize.

Acid, as a chemical reagent, dilutes as reactions take place (in proportion with the power delivered) as a result of the lead compounds, the concentration is reduced and the internal conductivity is therefore reduced. Because of the diluting acid the number of reactions is reduced (current decreases), because of the increasing internal resistance the terminal voltage decreases too (even with constant electromotive force!) (voltage reduction) which means a considerable reduction in total output occurs. Our invention is based on the following realizations:

if suitable unbalanced conditions are created the formation of porous $\alpha\text{-}PbO_2$ can be enhanced, while the prohibitive $\beta\text{-}PbO_2$ formation is repressed, which can be expected to extend the useful life of the battery.

if we use proper inner separation within the cell structure of the battery (strictly retaining the main electrical, mechanical and geometrical arrangement of the original battery), the functions of ignition and cranking can be separated (proper separation means the right proportioning of power to come up with the total need.)

separation is based in regulation of the acid diffusion by establishing a quasi-independent branch circuit within the battery.

the quasi-independent branch circuit feeds an electrical system which exists only as long as necessary to separate the functions. As soon as there is no more need for it, it ceases to exist and the entire system functions in the traditional mode.

The behavior of the branch circuit which only exists for a period of time can be described as follows:

If the load on the branch circuit is considerably (by orders of magnitude) smaller than the one on the main circuit (i.e., the ratios of ignition vs. cranking power), then the number of reactions on the plates affected by the two circuits differs considerably (by orders of magnitude), thus the concentration of the electrolyte in the main and branch circuits could show considerable differences. Those differences can be eliminated by thermal diffusion which needs time and which can be influenced by baffle plates advantageously so as to slow the normalization of the cell. This can be done in every cell or advantageously in one cell (e.g. cell #6) which can be equipped with an auxiliary electrode. We will discuss this case below (without restricting ourselves to this cell) as a for instance.

Near the auxiliary electrode in the divided cell the high acid concentration divides the inner resistance in cell #6 in two significantly different parts. Thus the terminal voltages of cell #6 could be very different temporarily. The other five cells function in the traditional mode, their change naturally reduces the terminal voltage of the branch circuit, even without any diffusion.

The terminal voltages of the main and the branch circuit differ considerably in cell #6. This phenomena occurs since the inner resistances of the bulk cells are additive and while the resistance of the main circuit is 6 Rb, the 5 Rb resistance of the branch circuit remains about constant. In case of small load resistance (when cranking) the inner resistance dominates which will adjust for a ratio of 6:5 terminal voltage in favor of the branch circuit (in other words while the main circuit terminal voltage drops to 10 V, the terminal voltage of the branch circuit remains 12 V). Measurements were performed for verification. Consequently 6 V terminal voltage in the main circuit would permit to achieve 7.2 V— in the branch circuit. Thus the change in terminal voltage by itself does not explain the phenomenon. Part of the change is explained by the development of a strong acid gradient (and the reaction quantity gradient) which causes changes in the quality of the plates too.

Quality differences in two different positive plates could mean change in polarity conditions in the relationship of the plates. This means that the electromotive force (e.m.f.) of the branch circuit could be different too, which is proven by the measured differences of the circuits in excess of 2 V. The non-equilibrium cell conditions caused by excessive acid gradient are the reason for the observed phenomena.

This quasi-independent cell formation can be realized in one or more cells depending on the desired result. The two extremes for accomplishing the task are the traditional battery construction vs. the use of two batteries. Our solution is placed in between. The separation is partial: the acid area of the entire cell is in common but has guiding and separating plates (baffles). The separation is temporary: it exists only as long as it is required to perform its function. This is not equivalent with a single battery, but at the same time it does away with the difficulties of using two batteries. It is referred to as a quasi-double circuited battery and it creates a pseudo-doubled vehicular electrical system. The combination of the two makes it possible that the functions be performed quasi independently, charging and handling of the battery can be performed in the traditional way, i.e., no modifications to standard circuits, and hence, interchangeability is retained. The degree to which separation is performed (more than one, but less than two independent circuits) can be determined. What is important is that a solution can be developed to operate any vehicle equipped with an Otto motor (i.e. internal combustion engine) by using the pseudo-double circuitry, i.e. considering the ordinary requirements of most charge/discharge starting systems, the battery has a universal application. At the same time by tuning the subdivision off the battery the system can be optimized. In any case it is also advantageous that with one cross connection the battery can be operated in the traditional mode without loss of the total capacity which means that consequences of possible malfunctioning can be easily avoided.

There are two ways to develop the quasi-double battery:

Installation of additional plates in a single cell or plurality of cells (supplemental, Alternate "K")

Separation of existing plates within a single cell or plurality of cells (separative, Alternate "L")

Development of the pseudo-double electrical circuitry can also be achieved in two ways:

If the requirement is reliability, e.g. the electronics must be fed continuously, the total storage capacity should be retained (Alternate +)

If the faster starting permits a smaller storage capacity, then the spare capacity can be reduced (Alternate −)

Naturally the different alternates can be combined according to the application and several, eg, K+, K−, L+, and L−, alternates can be developed.

Considering the overall behavior of the battery, cell #6 (the chosen auxiliary terminal cell) will have a different capacity from the others during cranking in the "L" Alternate. In the "K" Alternate it will have a different capacity from the other five during normal functioning of the engine. This is technically not permissible because cells characterized with a common current and having identical terminal voltage must have the same capacity otherwise the cell bearing the highest current harms the other cells. Thus in the case of Alternate "K" the first 5 cells would get overcharged during charging and with Alternate "L" the first five cells would discharge during cranking. Since during cranking the current needed for the starter is at least one magnitude larger than the one needed by the ignition, the discharge problems of Alternate "L" are of no concern especially since because of the expected advantages (quick ignition) this mode is of short duration. The problem with Alternate "K" is real, if it is installed, the other 5 cells will have a shorter life span. It is also theoretically possible that in the cells of Alternate "K" the higher load of short duration restricts the growth of the sulfate cells, which prolongs the life span. The evolving acid gradient forms a non-equilibrium which can compensate for such decrease in the life span, but a total increase of the life span in this case (Alternate "K") can not be expected.

We can make the following estimate for the life span of the double circuited (Alternate "L") battery:

The first 5 (unmounted) cells themselves alone have the same life span as the traditional battery since they see the total of the ignition and starter current. The load on the plates of cell #6 is uneven.

During ignition the plates of the main circuit of cell #6 carry a higher load by $n/(n-x)$ then the first 5 cells ("n" is the number of plates/cell, "X" the number of plates introduced in the branch circuit in cell #6). If one tenth of the plates are isolated then $n/(n-x)11.11$, that is the load will be larger by ten+. Actually it is even better than that because the first five cells also see the ignition current, in cell #6 the main circuit plates do not see this. It can be stated that depending on the ratio used in the sizing (0.1 is realistic) the load on the plates of cell #6 in the main circuit will increase by max 10+. Considering that during cranking the quick and safe starting is the advantage in the first place, this means no overload because it is of short duration. (The current fluctuations during starting can be considerably larger.)

The mixed reactions resulting from the big acid gradient extend the life span in any case because the sulfating resulting from equilibrium balanced processes (large $PbSO_4$ crystals) does not come about.

Thus in summary the life span of cell #6, if properly sized will certainly not be shorter than the one of the other five cells. Test results actually show a definite increase in total life span. The degree of increase depends on the characteristics of the active mass (also used for reference), it is a relative value which must be evaluated for every specific instance.

During sizing (when setting the x/n ratio, i.e. when reducing the energy reserves) the following is to be considered:

1. The x/n value has to be optimized so it is small enough not to overload the plates in the main circuit; but of sufficient size so the current density on the separated plates becomes considerably smaller than in the main circuit in order for the acid-gradient to develop.

2. The sheet (baffle) which separates the plates of the main and the branch circuit must be optimized in such a way that the substantial acid gradient is noticeable within the cell, but diffusion should be prevented as much as possible.

3. The required energy reserves provide for the energy needs of the ignition voltage and the useful ignition. Thus for the safe operation of vehicles twice the needed average of 20-25 Ah is provided. If the reliability of the ignition (and the starting time required) can be improved by b% with the double circuited arrangement then the safety reserves (by properly satisfying the demands of the customer) can be reduced by at least the same percentage, which results in b% savings in the lead required ("−" alternate). Since the weight of the battery is primarily affected by the amount of lead used, this results in direct weight reduction. Therefore, the double circuited construction also results in material savings (less lead needed) and energy savings (weight reduction, less dead weight to transport). The b% weight reduction (with a 10 kg battery and a 1,000 kg vehicle) a 0.01% total weight reduction is achieved in the total weight of the vehicle resulting in important energy savings considering an average useful life of 1M Km for the vehicle and the continuous acceleration requirements of city traffic. The lead savings (besides price considerations) are also important for environmental considerations. It must be emphasized that the new maintenance free batteries represent even more savings since their active ingredients are of higher purity and the active and passive labor content of the material saved is high.

The quasi-independent behavior is based on the independence of the chemical processes taking place on the plates. It is provided by microambiental differences developing in spite of the common acid space and by the simple separation of the inner circuits of the battery.

The tests were performed by simulating the dual circuited vehicular electrical system. Based on our tests it was obvious:

that the main and branch circuit function quasi-independently for a considerable time.

the voltage differential between the main and auxiliary circuit can reach 3 V-s in favor of the auxiliary circuit after the battery was discharged to half of its capacity.

the circuits show common behavior after the load is discontinued, under no load conditions the voltage difference which causes the equalizing current is insignificant.

quasi-independence of the main and branch circuits means that, even though the branch circuit follows the terminal voltage changes of the main circuit, it is higher by one half of one volt during the first 30 seconds, and even by more thereafter. The cold cranking tests showed that the 42 Ah nominal storage capacity battery used for our invention started the engine in 600 msec compared to the traditional 56 Ah battery which starter the engine in 700 msec. This means that the battery used for the invention which has a 25% lesser storage capacity was able to start the engine 15% faster than its traditional counterpart. Based on this it can be expected in actual applications that a 20-30% increase in ignition efficiency can be achieved, in other words by retaining the original ignition efficiency, a 20-30% reduction of the storage capacity can be realized by the user.

Since the higher ignition voltage (compared to other transformer and other electronic solutions) does not need mechanical energy, the conditions for starting are optimal. (This solution resembles starting a car by pushing when the battery is discharged. Ignition voltage from the terminals of the battery is supported by mechanical energy to provide movement. This example obviates that if proper ignition exists, starting can be achieved with rather small mechanical movement (i.e. the push), the success of the process is determined by the ignition—not by the starter. Whereas, at the same time the high current requirements in the starter spoils the relatively small ignition voltage. This is the essence of the virtual determination role.)

The principle behind the new battery system is the following:

Either one or several battery cells are used depending on need for utilization, e.g. the signals for the electronics require a 5-6 V auxiliary circuit which requires three cells. At the same time for continuous sensing of the charge either of one of the cells can be equipped with an electrode. The following will demonstrate a special case without surrendering the general applicability of the principle.

In a 12 V battery (containing 6 cells), the first five (preferably the ones close to the negative pole) remain unchanged and the 6th one is modified. After the positive outlet of the 6th cell another positive plate (plates) is inserted (Alternate "K"), or by separating one (or some) cells the battery is tapped, (Alternate "L"). Essentially we get a battery which has a common negative and two positive terminals.

The main positive terminal is the one closer to the negative one (main circuit), the secondary terminal has one (or several) plate(s) connected (secondary circuit). (It is advantageous to provide an isolating sheet or baffle for the separated plates of the secondary circuit.)

The battery thus modified has the following features:

1. When the main circuit is loaded the secondary circuit behaves in a quasi-independent manner. It does not follow the voltage drops in the main circuit (from several seconds to several minutes, depending on construction). It provides a potential difference of 12 V.

2. Even when the voltage in the main circuit drops to 50% (6V), the secondary circuit provides an observed 2-3 V more.

3. The two circuits can be loaded in a quasi-independent mode.

4. When the motor has started the two positive terminals can be connected and after the equalizing current is established, the battery will be charged in the traditional way and will take part in operating the vehicle respectively.

The thus constructed battery will function in the standard traditional way with its first five cells, therefore we only concentrate on the functioning of the sixth cell.

Most of the plate pairs of the 6th cell function in the traditional way. This may extend over as many pairs of plates as in the other cells (Alternate "K"), or over a number of plates reduced by what is used for the secondary circuit (Alternate "L"). The difference between alternate "K" and "L" is worth considering only by examining the entire unit (all 6 cells).

A well-known solution is to tap the 12 KV battery on the 6 V potential to take care of the operation of several electronic devices, but the potential decreases with high load. The referenced double circuited battery does not have this disadvantage as a result of the principle behind its functioning. It has a considerably larger voltage reserve for the generally 5 V requirement of the digital electronic systems even when the main battery section is about to run down. A further advantage of this solution is that the un-disturbed functioning of the secondary circuit is easier to accomplish.

The universal method of connections which is included as a subject of this invention can be expanded for further functions. It is suitable to separate the main and auxiliary circuits for a period of time and after that it reconnects them to secure normal functioning.

The solution of this task will be demonstrated with examples of circuitry which can be installed in both gasoline and diesel motor driven vehicles. In a diesel type system, the present invention optimizes the functioning of the glow plugs with the double circuited solution of this invention. The plugs are separated for the duration of their heating cycle and can be controlled by a voltage which can be measured by an indicating resistor. Under normal operation it does not differ from the traditional scheme. The pseudo double-circuited mode is separated from the normal circuit by relays, after ignition is established the two pseudo-independent circuits become united. The connection diagram for gasoline engines is illustrated hereinafter in two parts. It consists of the separated double system, and the united system operating normally. Separation and combination of the systems is handled by an auxiliary signal receiver which also regulates the traditional or the quasi double-circuited operating mode.

In addition to the above described electrical (electromechanical, signal receiver) solution an example is also shown for a practical mechanical construction of an ignition switch where the pseudo double-circuit is established only for the critical time period and also the two circuits can be united by mechanical means. With this construction the ignition switch itself separates the pseudo double-circuitry which, when normal operation is established and the ignition switch is left alone in its normal position, will function as a single circuit.

A considerable advantage of this system is that it does not necessarily need a newly constructed double circuitry, it can be operated interchangeably with the traditional battery by giving up the advantages of the double circuitry.

The double circuited vehicular electrical system provides a quasi-independent solution for both high amperage (starter, lights) and low amperage (ignition, glow plugs, servo electronics, etc.) electrical systems with the following characteristics:

the low power and high power circuits are separated when this is important (e.g. operation of electronics, during cold cranking) but are united when power requirements are not divergent (during normal operation after starting successfully.)

the low power circuit is well filtered especially from the transients during starting.

the dual circuitry is provided by a specially constructed battery.

the dual circuited vehicle can be operated with a conventional battery interchangeably.

The advantages of the invention are summarized as follows:

1. Utilizing the quasi double-circuited battery ignition is independent, faster and safer and it becomes possible to reduce the amount of lead applied by reducing power reserves.
2. Continuous operation of the electronics (with small voltage variations) is simple to achieve.
3. Measures the acid concentration level continuously (controls the charge).
4. Solution is exchangeable with the traditional.
5. Technical parameters of the new battery conform to general specifications after conversion as they did before.
6. Life span of the new battery is longer than the conventional.
7. In the case of the failure of the quasi double-circuited battery the conventional circuit can be established with one change in the wiring.
8. The rapid-starting capability provides environmental protection advantages. The amount of incompletely combusted exhaust fumes is reduced with correspondingly less environmental contamination. As a result starting and stopping of the motor will not contaminate the environment the way the traditional ignition and car electrical systems do.
9. Protection of electronics from galvanic (DC) noises is resolved during starting.
10. The quasi double-circuited battery and the pseudo-double-circuited vehicular electrical system can be optimized for a given vehicle (by type and/or individually), method of construction can be selected.
11. The invention can have an important role not only in starting vehicles, but also where different power and voltage requirements must be provided by a battery. Variations caused by acceleration of electrically driven vehicles which have their own power source and are caused by sudden surges in need of power can be isolated from the finer electronics (controls, calculators, etc.)
12. Due to the fast starting, the main circuit in the new construction can be loaded by 20% more current as the normal one.

DETAILED DESCRIPTION OF THE PREFERRED EMBODIMENT

Figure 1:
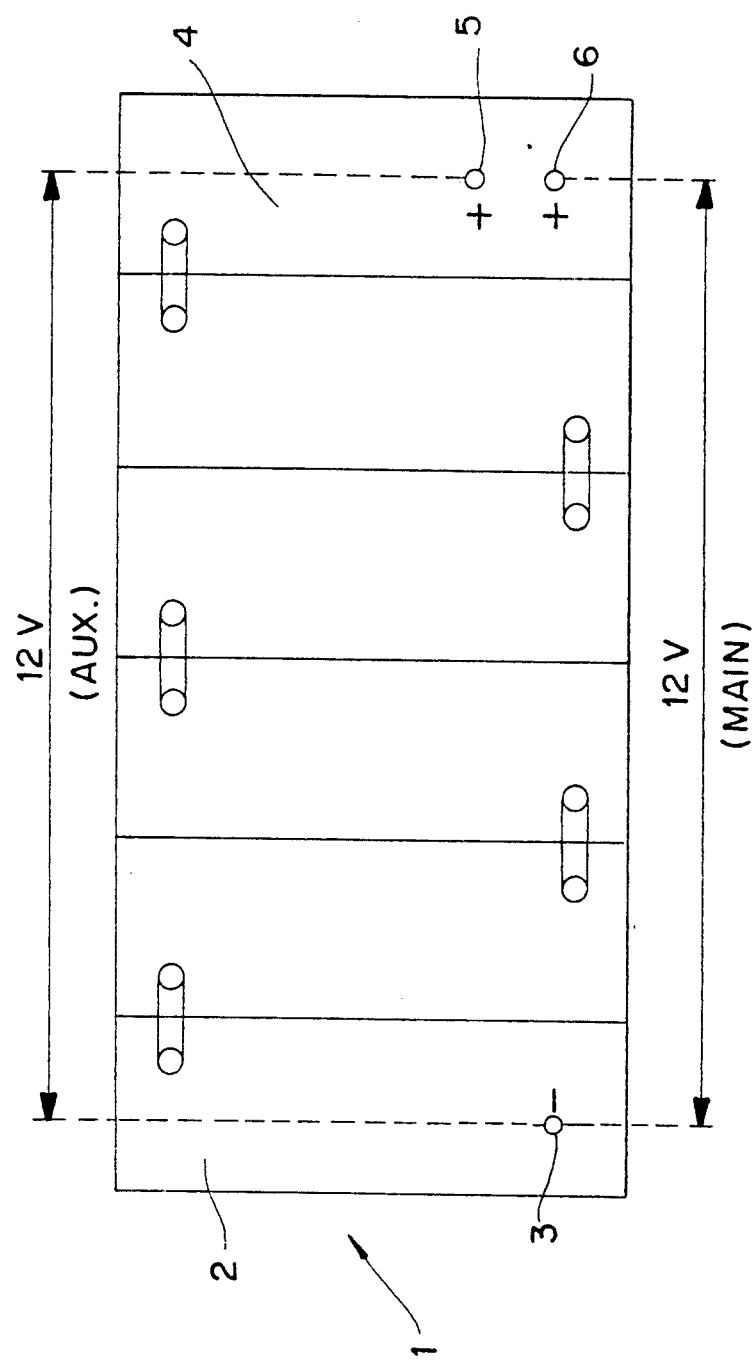
FIG. 1 shows a plan view a battery according to the present invention.

A battery according to the present invention is generally shown in FIG. 1. The battery 1 includes a conventional casing, ie, hard resin, along with a plurality of conventional cells 2, ie, multiplate/acid bath, arranged juxtaposed and each having separate acid baths. The cells are conventionally connected in series, ie, + to −, to form a composite battery of the multiple of the output voltages of the individual cells. In this instance six cells are connected in series to form a 12 V nominal battery. The battery has a common negative terminal 3 and has a common (main) positive terminal 6 and additionally includes an auxiliary positive terminal 5 off of the sixth and modified cell 4.

Figure 2A:
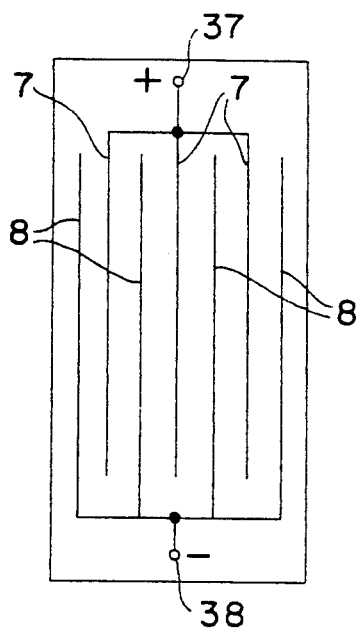
FIGS. 2a–2d shows an embodiment of the present invention for common negative terminal automotive electrical circuits.
Figure 2B:
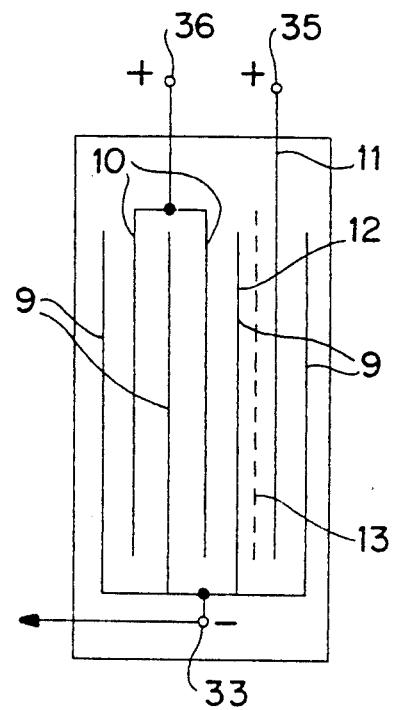
Figure 2C:
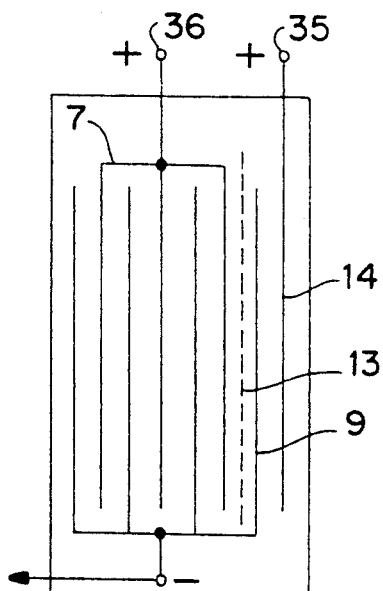
Figure 2D:
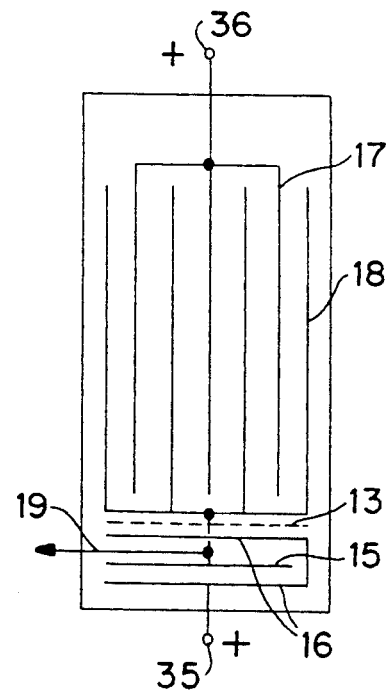

FIGS. 2b–2d show various and alternative embodiments of the battery according to the present invention as contemplated for a common negative automotive electrical system. FIG. 2a shows a standard cell for reference and comparison to the modified cells.

In FIG. 2a a standard cell is shown as including a common positive terminal 37 connected to the nominally positive plates 7. These plates are placed in an acid bath and are alternately positioned between nominally negative plates 8 which are connected to a common negative terminal 38. In the usual and customary manner of battery chemistry previously described, the cell generates a potential between the terminals.

In FIG. 2b an "L" alternative embodiment, ie, dividing the plate count of a cell typical to the remaining cells in the battery to form the auxiliary terminal plate, is shown. The cell includes the typical count (in this case three) of negative plates 9 connected to a common negative terminal 33. The positive plates are divided into two sets 10 and 11. The pair of plates 10 connect to form the main positive terminal 36 of the cell and the separated positive plate 11 forms the auxiliary positive terminal 35. The separated positive plate 11 is isolated with a single negative plate of the connected negative plates in the common acid bath by a baffle or sheet structure 13. This baffle may be comprised of material similar to the casing of the battery, ie, resin, and performs the function of limiting acid mixing between the isolated/auxiliary and main portions of the modified cell. To ensure proper battery operation, total isolation is not desirable. Although a baffleless embodiment will work; to advantageously ensure relatively prolonged voltage differences between the main and auxiliary terminals of the cell, a baffle should be used.

FIG. 2c shows a "K" alternative embodiment of the present battery. In this K embodiment additional plates are added to a typical cell of those comprising the remainder of the battery. In this way the auxiliary cell has a slightly higher capacity as opposed to the "L" alternative. The cell in FIG. 2c includes a negative set of plates 9 having an additional single plate to contribute to the auxiliary/separated portion of the cell. The positive plates 7 are common in number (in this case three) to the remaining and typical cells of the battery and are connected to form the main positive terminal 36 of the cell. An additional plate 14 is added to form the plate for the auxiliary terminal 35. Again a baffle 13 is shown as being present to advantageously prolong the effects of the double circuit cell during cycles when the double circuit are in use, ie, during starting or other heavy load circumstances.

FIG. 2d shows another embodiment of a "K" style, ie, additional structure, battery according to the present invention. In this embodiment an additional negative plate 15 is positioned between a pair of additional positive plates 16 at one end of the battery casing. The negative plate 15 is connected to the other common negative plates 18 of the cell which are in turn connected to form the negative terminal 19 of the cell. Additional positive plates 16 connect to form the auxiliary terminal 35 of the cell. A baffle plate 13 to assist in separating the cell acid bath is also shown.

Figure 3A:
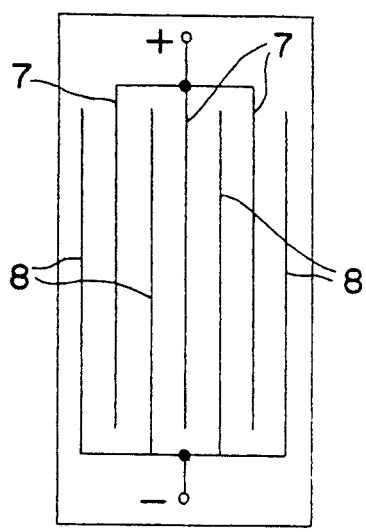
FIGS. 3a–3d show an embodiment of the present invention for common positive terminal automotive circuits.
Figure 3B:
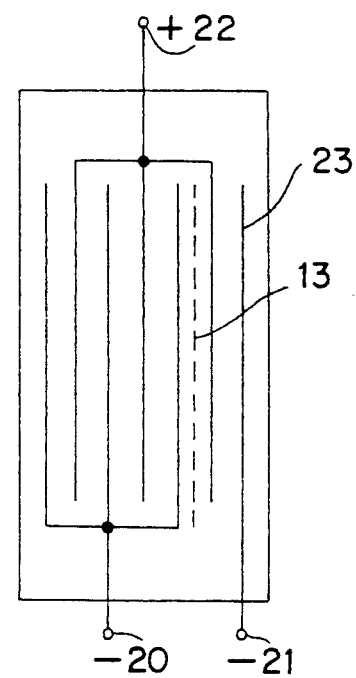
Figure 3C:
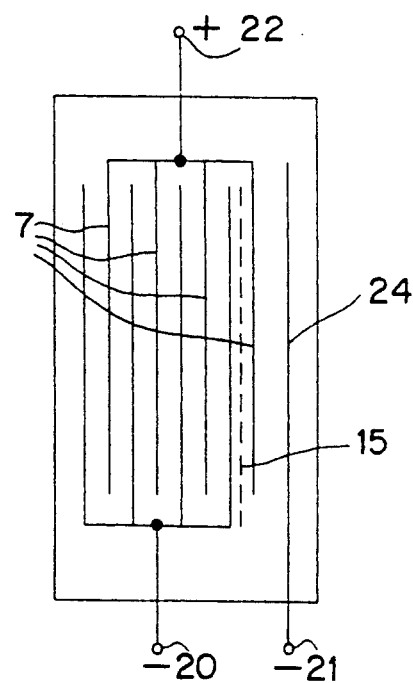
Figure 3D:
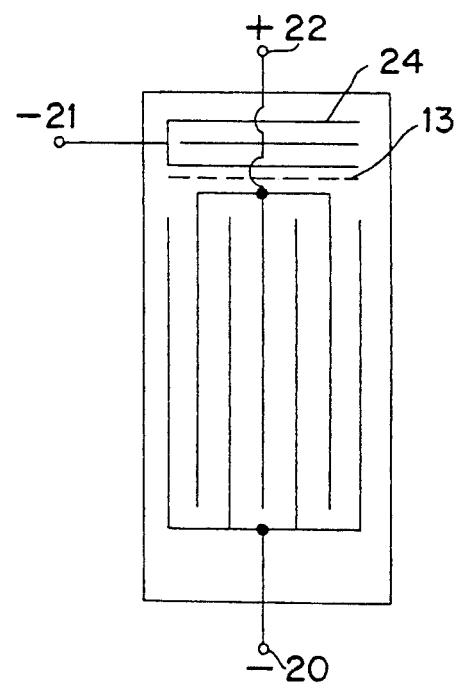

FIGS. 3b-3d show various and alternative embodiments of the battery according to the present invention as contemplated for a common positive automotive electrical system. FIG. 3a shows a standard cell for reference and comparison to the modified cells.

In FIG. 3b an "L" alternative embodiment, ie, dividing the plate count of a cell typical to the remaining cells in the battery to form the auxiliary terminal plate, is shown. The cell includes the typical count (in this case three) of positive plates connected to a common positive terminal 22. The negative plates are divided into two sets. One set of plates connect to form the main negative terminal 20 of the cell and the separated negative plate 22 forms the auxiliary negative terminal 21. The separated negative plate 22 is isolated with a single positive plate of the connected positive plates in the common acid bath by a baffle or sheet structure 13.

FIG. 3c shows a "K" alternative embodiment of the present battery. In this K embodiment additional plates are added to a typical cell of those comprising the remainder of the battery. In this way the auxiliary cell has a slightly higher capacity as opposed to the "L" alternative. The cell in FIG. 3c includes a set of negative plates 20 and has an additional single plate 24 to contribute to the auxiliary/separated portion of the cell. The positive plates 7 are common in number (in this case four) to the remaining and typical cells of the battery and are connected to form the main positive terminal of the cell. An end plate of the positive plates is isolated to form the plate for the auxiliary terminal 21 negative plate 24. Again a baffle 24 is shown as being present to advantageously prolong the effects of the double circuit cell during cycles when the double circuit are in use, ie, during starting or other heavy load circumstances.

FIG. 3d shows another embodiment of a "K" style, ie, additional structure, battery according to the present invention. In this embodiment an additional positive plate is positioned between and surrounded by a pair of additional negative plates at one end of the battery casing. The positive plate is connected to the other common positive plates of the cell which are in turn connected to form the positive terminal 22 of the cell. Additional negative plates connect to form the auxiliary negative terminal 21 of the cell. A baffle plate 13 to assist in separating the cell acid bath is also shown.

Figure 4A:
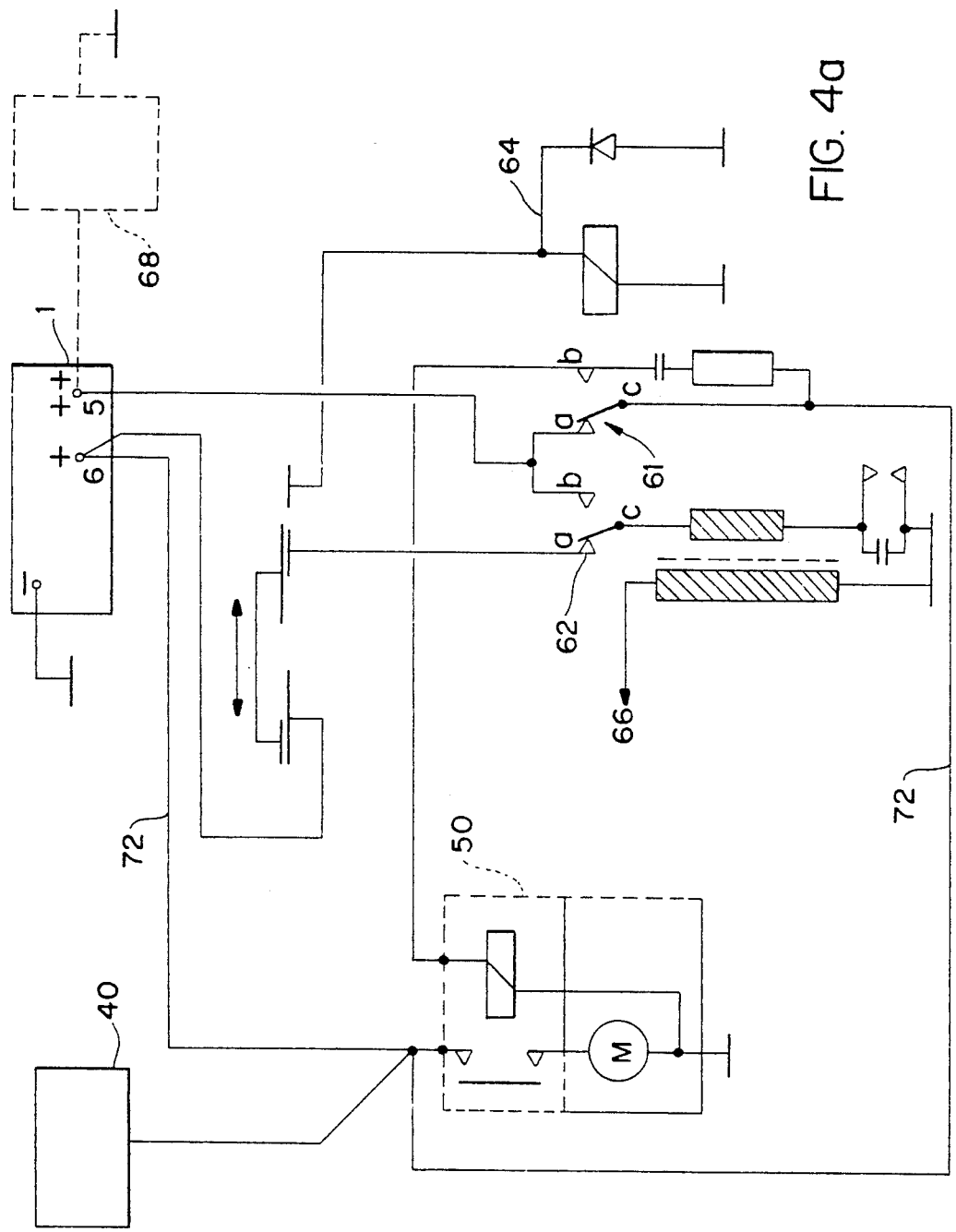
FIGS. 4a–4b show an electromechanical circuit for incorporation of a psuedo double circuit battery according to the present invention.
Figure 4B:
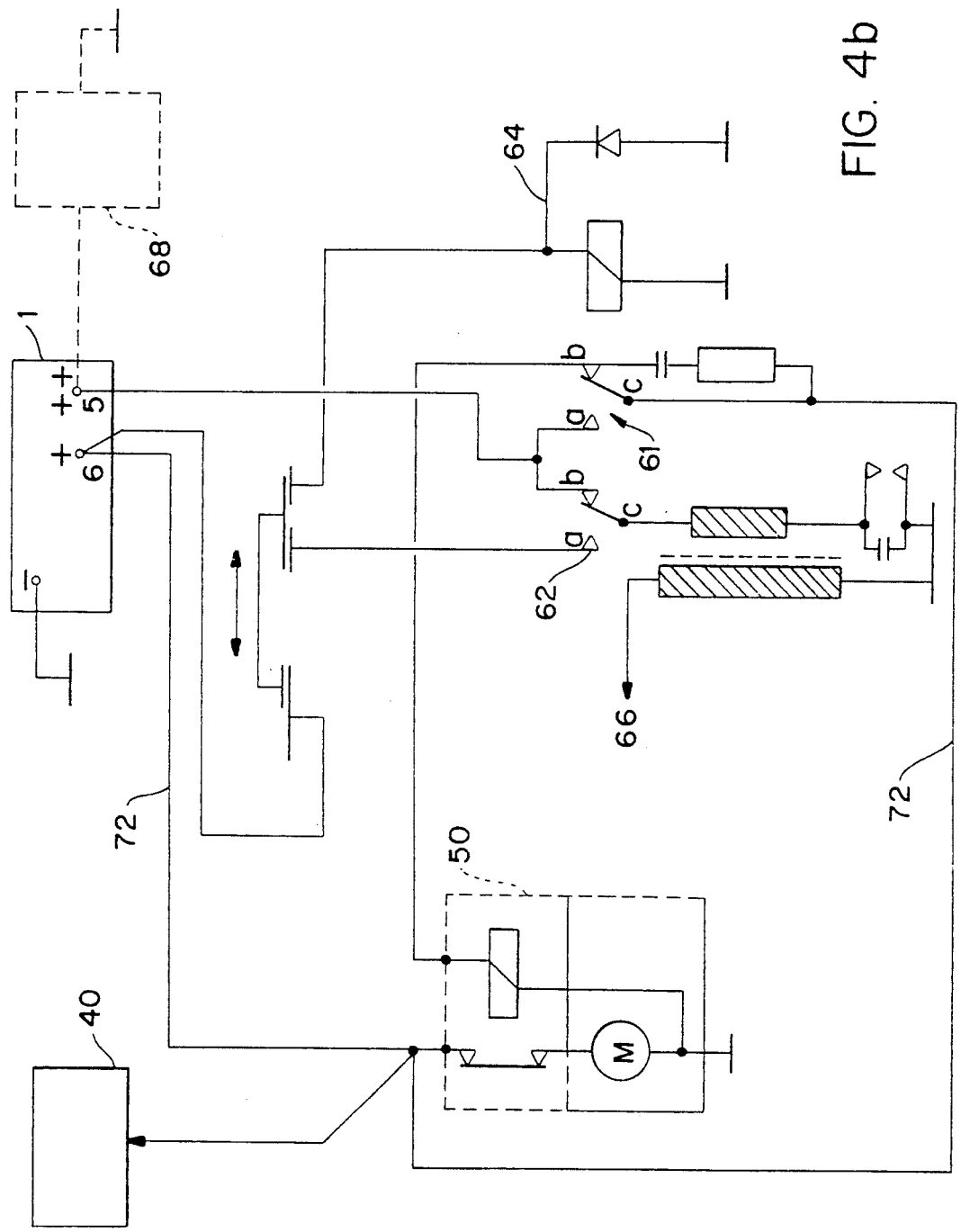

FIGS. 4a-4b show an electromechanical circuit for automotive use incorporating the features of the battery according to the present invention. FIG. 4a shows the circuit under running conditions, ie, motor already running, battery charging as necessary. FIG. 4b shows the circuit under starting conditions, ie, heavy starter cranking load and isolated lighter ignition and accessory load. The battery 1 is connected directly from the main positive terminal 6 of the battery to the starter motor 50 in the conventional manner along a starter circuit 72. A generator 40 is also connected into the circuit between the positive terminal and the starter in the conventional manner. An ignition switch 60 is provided which has the usual running and starting (cranking) positions. In the running condition the starter circuit 72 is connected at switch 61 to the auxiliary terminal 5 of the battery 1. As such both terminals of the battery, main 6 and auxiliary 5, are connected to ignition circuit 66 through switch 62. The switches 61 and 62 along with activator 64 (solenoid magnet) comprise the auxiliary signal receiver which enables/disables the separate circuit function of the battery In FIG. 4a the activator 64 is shown in the running configuration.

In FIG. 4b the circuit is shown in the starting configuration. Ignition switch 60 is urged to a cranking position and energizes activator 64 The activator urges switches 61 and 62 to their respective cranking positions as shown. During cranking, switch 61 disconnects the main and auxiliary terminals 6 and 5 of battery 1 and energizes the starter motor solenoid to connect starter 50 to crank. At the same time, switch 62 disconnects main terminal 6 from the ignition circuit 66 and connects the ignition circuit exclusively with the auxiliary terminal 5. In this manner, the ignition circuit 66 is provided with the stable and elevated voltage from the auxiliary terminal 5 while the starter circuit 72 draws on the main terminal 6.

In each of FIG. 4a and 4b additional electronic equipment 68 requiring a stable voltage is shown connected to auxiliary terminal 5. The switching of this equipment 68 is controlled by the same switching as for the starter circuit 66.

Figure 5:
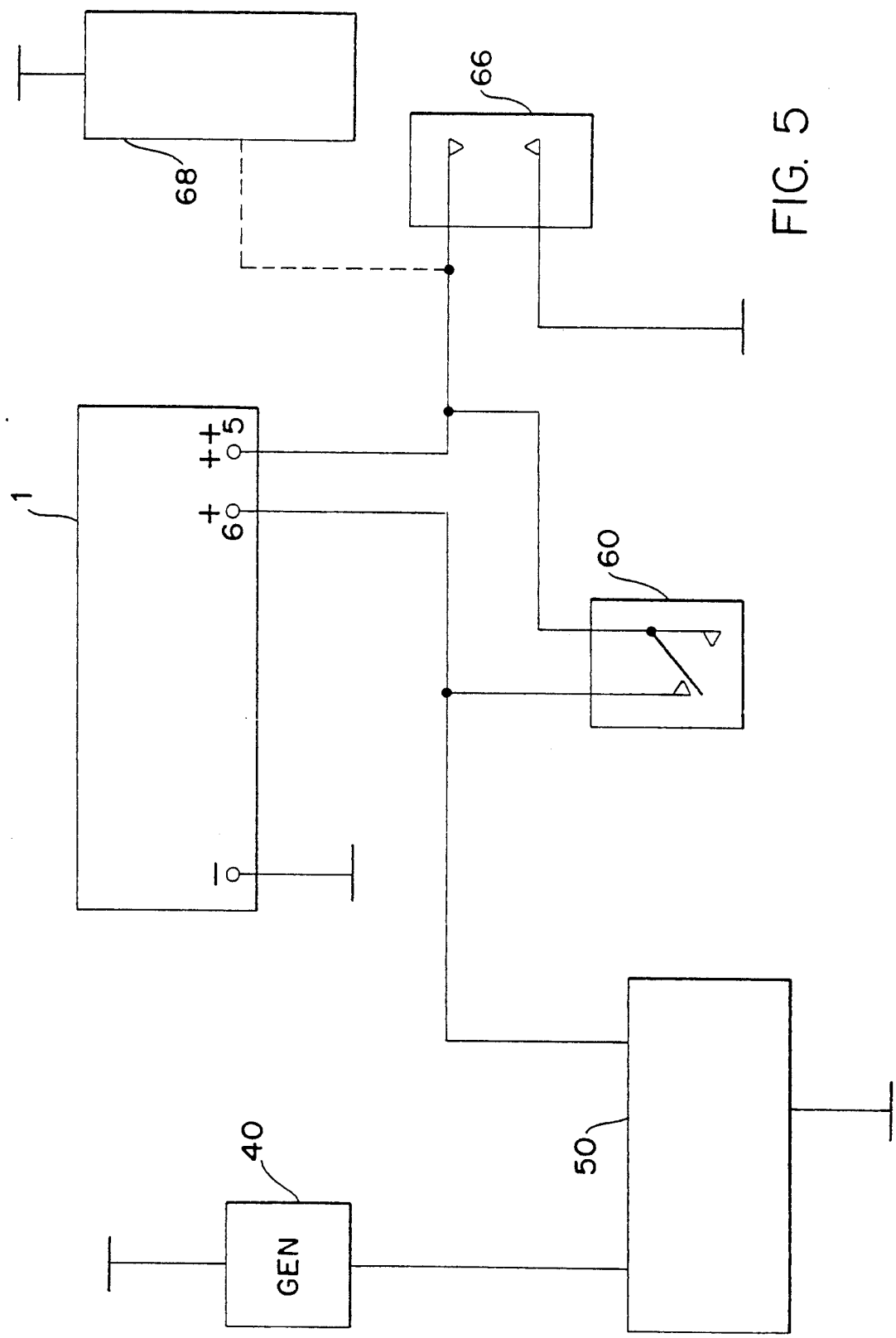
FIG. 5 shows a mechanical system circuit for incorporation of a psuedo double circuit battery according to the present invention.

FIG. 5 shows a mechanical circuit system for connecting/disconnecting the main and auxiliary terminals 6 and 5 for their respective roles in running and starting conditions. The circuit includes a dual circuit battery 1 having an auxiliary 5 and main terminal 6. The main terminal 6 is connected directly to the starter motor 50 and to a switch element of an ignition switch 60. In the running condition switch 60 connects the main and auxiliary terminals, which are in turn connected to ignition circuit 66. In a starting/cranking condition, the switch 60 disconnects the terminals and isolates the ignition circuit with the auxiliary terminal 5 only. The switch is advantageously connected with the ignition-key-switch.

What is claimed is:

1. A battery comprising:
    a casing;
    a plurality of conventional battery cells placed within said casing, each of said cells including positive and negative plates and associated positive and negative terminals for said respective positive and negative plates, said plates of said cells being electrically connected in series between their respective positive and negative terminals, and including a main positive terminal and main negative terminal electrically connected from said series connection of said cells; and,
    at least one of said plurality of said cells forming a modified cell and including an additional auxiliary terminal connected to a separated plate within said cell.

2. A battery as in claim 1, wherein:
said modified cell is a last one of said series connection of cells in said battery.

3. A battery as in claim 1, wherein:
said separated plate comprises a separated one of said plates included within the number of plates n existing in said conventional cells of said battery so that said modified cell includes a separated plate and n−1 other plates comprising the remainder of said plates within said modified cell.

4. A battery as in claim 1, wherein:
said separated plate comprises an additional plate included within said modified cell, so that the number of plates in a conventional cell of said battery is n and the number of plates in said modified cell includes said separated plate and n other plates comprising the remainder of said plates in said modified cell.

5. A battery as in claim 1, wherein:
said separated plate comprises a positive plate.

6. A battery as in claim 1, wherein:
said separated plate comprises a negative plate.

7. A battery as in claim 1, wherein:
said number of cells within said battery is more than 2.

8. A circuit and battery for supplying a main and auxiliary potential to separate load demands, comprising:
    a battery having a casing and a plurality of conventional battery cells placed within said casing, each of said cells including positive and negative plates and associated positive and negative terminals for said plates, said plates of said cells being electrically connected in series between their respective positive and negative terminals, and including a main positive terminal and a main negative terminal electrically connected from said series connection of said cells, and at least one of said plurality of cells forming a modified cell and including an additional auxiliary terminal connected to a separated plate within said cell; and,
    a switch means, connected to one of said main positive or negative terminals and connected to said auxiliary terminal, for selectively combining or separating the electrical potential of said terminals connected to said switch and supplying the combined electrical potential to a load in a first position of said switch, and supplying the respective separate potentials of said main and auxiliary terminals to main and auxiliary loads in a second position of said switch.

9. A circuit and battery as in claim 8, wherein:
said modified cell is a last one of said series connection of cells in said battery.

10. A circuit and battery as in claim 8, wherein:
said separated plate comprises a separated one of said plates included within the number of plates n in said conventional cells of said battery so that said modified cell includes a separated plate and n-1 other plates comprising the remainder of said plates in said modified cell.

11. A circuit and battery as in claim 8, wherein:
said separated plate comprises an additional plate included within said modified cell, so that the number of plates in said conventional cell is n and the number of plates in said modified cell includes said separated plate and n other plates comprising the remainder of said plates within said modified cell.

12. A circuit and battery as in claim 8, wherein:
said separated plate comprises a positive plate.

13. A circuit and battery as in claim 8, wherein:
said separated plate comprises a negative plate.

14. A circuit and battery as in claim 8, wherein:
said number of cells within said battery is more than 2.

15. A battery as in claim 1, further comprising:
an acid bath in each of said cells; and,
baffle means included in said modified cell for inhibiting mixing of said acid bath in said modified cell, said baffle being positioned between said a volume of said modified cell including said separated plate and one of another of said plates within said modified cell and a remaining volume of said modified cell.

* * * * *